United States Patent [19]

Yesnik

[11] Patent Number: 5,453,317
[45] Date of Patent: Sep. 26, 1995

[54] FRICTION MATERIAL COMPRISING POWDERED PHENOLIC RESIN AND METHOD OF MAKING SAME

[75] Inventor: Marc A. Yesnik, Glen Ellyn, Ill.

[73] Assignee: Borg-Warner Automotive, Inc., Sterling Heights, Mich.

[21] Appl. No.: 114,871

[22] Filed: Aug. 31, 1993

[51] Int. Cl.⁶ ......................................................... B32B 5/16
[52] U.S. Cl. ........................... 428/283; 428/290; 523/149; 523/156; 523/155
[58] Field of Search ..................................... 523/149, 156, 523/155; 428/283, 290

[56] References Cited

U.S. PATENT DOCUMENTS

| | | | |
|---|---|---|---|
| 3,270,846 | 6/1966 | Arledter et al. | 192/107 |
| 3,306,401 | 2/1967 | Dasse | 188/251 |
| 3,365,041 | 1/1968 | Stormfeltz | 192/107 |
| 3,390,750 | 7/1968 | Albertson | 192/107 |
| 3,429,766 | 2/1969 | Stormfeltz | 161/35 |
| 3,520,390 | 7/1970 | Bentz | 192/107 |
| 3,647,722 | 3/1972 | Albertson et al. | 260/2.5 F |
| 3,738,901 | 6/1973 | Matsushima et al. | 161/42 |
| 4,130,537 | 12/1978 | Bohrer | 260/38 |
| 4,226,816 | 10/1980 | Yamamoto et al. | 264/29.4 |
| 4,262,788 | 4/1981 | Yamamoto et al. | 192/107 M |
| 4,278,584 | 7/1981 | Noguchi et al. | 260/38 |
| 4,279,696 | 7/1981 | Piersol | 162/146 |
| 4,336,305 | 6/1982 | Tanaka | 428/336 |
| 4,349,595 | 9/1982 | Trainer et al. | 428/64 |
| 4,374,211 | 2/1983 | Gallagher et al. | 523/156 |
| 4,387,079 | 6/1983 | Kasai et al. | 423/344 |
| 4,504,543 | 3/1985 | Yamashita et al. | 428/338 |
| 4,657,951 | 4/1987 | Takarada et al. | 523/153 |
| 4,743,634 | 5/1988 | Royer | 523/150 |
| 4,935,214 | 6/1990 | Pugar et al. | 423/324 |
| 5,132,349 | 7/1992 | Iimuro et al. | 324/265 |

FOREIGN PATENT DOCUMENTS

| | | |
|---|---|---|
| 0123312A3 | of 0000 | European Pat. Off. |
| 4205645A1 | of 0000 | Germany. |
| 2828918A1 | of 0000 | Germany. |
| 2163784 | of 0000 | United Kingdom. |
| 2205592 | of 0000 | United Kingdom. |

OTHER PUBLICATIONS

European Search Report—dated Dec. 22, 1994.

*Primary Examiner*—Christopher W. Raimund
*Attorney, Agent, or Firm*—Emch, Schaffer Schaub et al.; Greg Dziegielewski

[57] ABSTRACT

The present invention relates to a non-asbestos friction material comprising a phenolic or phenolic-modified resin (and in certain embodiments, silicon nitride particles) incorporated into a fibrous base material which is then impregnated with a silicone resin. The friction material is prepared by mixing the phenolic or phenolic-modified resin (and, in certain embodiments, silicon nitride particles) into an aqueous paper formulation, forming a porous fibrous base material, impregnating the fibrous base material with a silicone resin, and heating the impregnated material to cure the phenolic resin and the silicone resin.

20 Claims, 6 Drawing Sheets

FRICTION MATERIAL COMPRISING POWDERED PHENOLIC RESIN AND METHOD OF MAKING SAME

TECHNICAL FIELD

The present invention relates to a method for making friction materials and the friction materials produced thereby. In particular, the non-asbestos friction material comprises a silicone resin impregnated paper which is formed from an aqueous system which includes raw paper pulp forming materials, at least one particulate phenolic resin and, in certain embodiments, silicon nitride particles and, optionally, other materials such as diatomaceous earth and cashew nut oil particles. It is to be understood, however, that other ingredients useful in friction paper formulations are compatible with the present invention. The friction material is useful in high energy applications and has an increased coefficient of dynamic friction over conventional friction materials.

BACKGROUND ART

New and advanced transmission systems and braking systems are being developed by the automotive industry. These new systems often involve high energy requirements. Therefore, the friction materials technology must also be developed to meet the increasing energy requirements of these advanced systems.

The friction material must have high heat resistance in order to be useful in the new transmission and braking systems. Not only must the friction material remain stable at high temperatures, it must also be able to rapidly dissipate the high heat that is generated during operating conditions.

The high speeds generated during engagement and disengagement of the new transmission and braking systems mean that a friction material must be able to maintain a relatively constant frictional engagement throughout the engagement and disengagement of the friction material. It is important that the frictional engagement be relatively constant over a wide range of speeds and temperatures in order to minimize "grabbing" of materials during braking or "shuddering" of the transmission system during power shift from one gear to another.

In particular, the new high energy friction material must be able to withstand high speeds wherein surface speeds are up to about 12,000 feet/minute. Also, the friction material must be able to withstand high energy pressures up to about 700 psi. It is also important that the friction material be useful under limited lubrication conditions and also be able to withstand the extreme pressures and speeds applied during use.

Previously, asbestos fibers were included in friction materials. For example, the Arledter et al. U.S. Pat. No. 3,270,846 patent describes phenolic and phenolic-modified resins in asbestos-filled friction materials. Now, however, due to health and environmental problems, asbestos is no longer being used. However, friction materials without the presence of asbestos not only encountered structural integrity problems during processing but also lacked the thermal stability which the asbestos provided. More recent friction materials have attempted to overcome the absence of the asbestos in the friction material by impregnating the paper or fiber materials with phenolic-modified and other new resins. These friction materials, however, do not rapidly dissipate the high heat generated, which may contribute to reduced heat resistance and unsatisfactory coefficient of friction performance.

While phenolic resins are conventionally used as an impregnant in wet friction materials for wet clutch applications, the phenolic resins have various limitations. The phenolic resin friction materials do not have the high heat resistance necessary for use with the new high energy transmission systems. In particular, the phenolic resins carbonize at a temperature of about 450° C. which is too low to be useful in high energy applications. In addition, phenolic resins are rigid materials and when the phenolic resins are used in a friction material, uneven lining wear, and separator plate "hot spots" are more likely to result if uniform contact is not obtained.

Attempts to overcome the limitations and drawbacks of phenolic resin impregnated friction materials include the replacement of phenolic resins with other thermosetting impregnating resins. One attempt to produce friction materials involves the modification of a phenolic resin with various synthesized modifications.

In order for friction materials to be useful, the friction material must have a wide variety of acceptable characteristics. The friction material must be resilient (or elastic) yet resistant to compression, abrasion and stress; have high heat resistance and be able to dissipate heat quickly; and, have long lasting, stable and consistent frictional performance. If any of these characteristics are not present, optimum performance of the friction material is not met.

It is also important that a suitable impregnating resin be used with the friction material in order to achieve a high energy application friction material. The wet friction material must possess uniform absorbency and must have good tensile and shear strengths both when saturated with the wet resin during impregnation and when saturated with brake fluid or transmission oil during use. In selected applications, it is important that the friction material have a low density and high porosity such that there is a high fluid absorbency capacity during use. Thus, it is important that the friction material not only be porous, but also be flexible and compressible. The fluids absorbed into the friction material must be capable of being squeezed or released from the friction material quickly under the pressures applied during operation of the brake or transmission. It is also important that the friction material have high thermal conductivity to also help rapidly dissipate the heat generated during operation of the brake or transmission.

In view of the need for a better friction material, and as a result of extensive research, a new friction material with improved characteristics has now been developed. As far as is known, there is no disclosure of a friction material for use in transmission systems wherein the friction material is made by adding a powdered phenolic resin and a silicon nitride to a mixture of paper pulp, forming a paper friction material and then impregnating the phenolic resin-paper friction material with a silicone material.

Until the present invention there has been no disclosure or suggestion that a powdered phenolic resin material and powdered silicon nitride could successfully be blended with raw paper pulp to form a friction paper material, which could then be impregnated with a silicone material to form a friction lining material. On the contrary, previous attempts to use silicone resins in friction materials have not had good acceptance in the friction lining industry. A friction lining that is impregnated or saturated with a silicone resin has typically poor shear strength and delamination resistance.

Further, the silicone resin tends to cause the friction lining to be too elastic which then creates undesirable friction characteristics (such as potentially large friction fade). It is not surprising that past friction lining compositions formed with a phenol-formaldehyde or polysiloxane resin have not been used successfully. Such compositions do not have the necessary constant coefficient of friction characteristics and thus fail under high energy and high heat conditions.

Accordingly, it is an object of the present invention to provide an improved friction material with reliable and improved properties compared to those of the prior art.

A further object of this invention is to provide friction materials with high thermal conductivity, porosity and strength.

DISCLOSURE OF THE INVENTION

In order to achieve the requirements discussed above, many friction materials were evaluated for friction and heat resistant characteristics under conditions similar to those encountered by friction materials during operation. Commercially available brake linings and transmission materials were investigated and proved not to be suitable for use in the new high energy applications currently being developed by the automotive industry.

The present invention relates to a novel non-asbestos friction material which is especially useful in wet friction applications such as brakes and clutch applications where the friction material absorbs a fluid (such as brake fluid or automatic transmission fluid) during use. According to the present invention a porous fibrous base material is formed comprising a powdered phenolic or modified phenolic resin (and in certain embodiments, silicon nitride particles) homogeneously blended or mixed with an aqueous slurry of fibrous material. The porous fibrous base material is then impregnated with a silicone based resin to form a high energy friction material. It is also contemplated that if the phenolic and silicone resins are solvent compatible, the phenolic resin can be blended with the silicone resin and used to impregnate or saturate the fibrous base material. One example comprises a liquid phenolic resin in ethanol and a liquid silicone resin in isopropanol. Such high energy friction material has surprisingly high friction stability and high heat resistance.

The friction material of the present invention comprises a resilient, heat resistant friction material. The friction material of the present invention prevents uneven wear or "hot spots" from developing during the useful life of the friction material. When there is little uneven wear on the friction material, there is a more "steady state" wear on the clutch or brake and therefore, more consistent performance of the clutch or brake. Further, the friction material of the present invention shows good shear strength such that the friction material resists delamination during use.

BEST MODE OF CARRYING OUT THE INVENTION

Instead of using a solvent-based phenolic resin as an impregnant, the present invention provides adding a solid powdered phenolic or phenolic-modified resin into an aqueous paper slurry or pulp formulation. This addition of powdered phenolic resin in the paper pulp formulation surprisingly provides the advantages of having a phenolic resin present in the friction material without the disadvantage of having to remove the solvent which carried the phenolic resin. Further according to the invention, it is found that if the friction paper containing the solid phenolic resin powder is impregnated with a silicone resin, a surprisingly good friction material results. The friction material has higher energy capacity and higher coefficient of friction than conventional friction materials. It is further surprisingly found that if silicon nitride powder is incorporated into the aqueous paper slurry formulation along with the powdered phenolic resin, there is further improvement in the dynamic coefficient of friction characteristics of the resulting friction material. It is especially surprisingly that powdered silicon nitride improves the friction characteristics of the friction materials since fibers of silicon nitride are abrasive and thus not suitable for inclusion in friction materials due to their potential for abrasiveness of the end use products.

Various types of fibrous or raw pulp materials are useful with the present invention. Particularly useful fibrous materials can be comprised of cotton fibers, glass fibers, carbon fibers and/or aramid polymer fibers such as Kevlar® floc and/or pulp fibers which are generally designated as aromatic polycarbonamide materials. It is to be understood that various paper formulations are useful in the present invention and that other materials can be present in the paper formulations. For example, cotton burns at a relatively low temperature of approximately 350° C. Therefore, a friction material has a range of expected thermal stability based on the raw ingredients used in the fibrous based material during the paper forming process. Fibrous based materials comprise relatively high percentages of cotton would be less thermally stable than fibrous based materials containing a more thermally stable ingredient such as graphite. The ranges and percentages of such ingredients are dependent upon the end use of the friction material and whether such friction material is subjected to moderate energy requirements or high energy requirements.

According to the present invention, at least one phenolic or phenolic-modified resin is incorporated into an aqueous paper pulp or slurry. Various phenolic and phenolic-modified resins useful in the present invention include, for example, phenolic novolac resins which are water insoluble solid particulate phenol-formaldehyde resins.

Phenolic resins useful in the present invention include the following novolac resins from Ashland Chemical Inc., Columbus, Ohio: PB-200A, a ground novolac phenolic resin with about 3–4% free phenol; PB-200B, a ground novolac phenolic resin with a hexamethylenetetramine crosslinker and about 3–4% free phenol; PB-206, a high molecular weight powdered or ground thermoplastic novolac phenolic-formaldehyde condensate resin with about 1–2% free phenol (typically about 1% free phenol); and, PB-207, a high molecular weight, powdered or ground novolac phenolic-formaldehyde condensate resin with a hexamethylenetetramine crosslinker and about 1–2% free phenol (typically about 1% free phenol). It is to be understood that various other phenolic novolac resins can be used and are contemplated as being useful with the present invention.

Both high static and high dynamic friction coefficients are required for new friction material applications. The friction and wear performance of the friction material can be further improved by the incorporation of silicon nitride particles into the raw paper slurry during the paper formation. In preferred embodiments, the silicon nitride particles have an average diameter size from about 0.5 to about 1.5 microns. In certain embodiments it has been found that silicon nitride particles having an average diameter size of about one micron work exceptionally well. One type of suitable silicon nitride particles is available from UBE Industries Inc. as $Si_3N_4$ grade SN-E-03. The silicon nitride particles increase the dynamic coefficient of friction when used at low levels of about 5%. The static coefficient of friction is increased when high levels of silicon nitride particle concentration, at about 15%, are used in the paper formulation.

If the initial coefficient of friction is low, then a friction material does not achieve its desired constant coefficient of friction value until after many uses or cycles of the friction material. The present invention provides a friction material having a high initial coefficient of friction. Further, when the dynamic coefficient of friction is close to the static coefficient of friction, there is a smooth transfer from one gear to another in a clutch operation. The present invention achieves a surprisingly good static to dynamic coefficient of friction ratio with the addition of silicon nitride particles in the friction paper.

The resin used to saturate a friction material can dramatically influence the performance of the friction material. The degree of toughness that a resin exhibits may be reflected by the friction material being able to maintain its integrity when tested. It is important that both the physical and frictional characteristics of friction material remain intact during the expected service period of the end use product such as a clutch plate or a brake lining. A friction material impregnated with a brittle resin may crack under a heavy load which collapses the open structure of the friction paper matrix. On the other hand, a friction material impregnated with an elastomeric resin would provide desired friction coefficient and torque, but may lack the wear resistance and the strength required to hold the friction paper matrix intact. Thus, an ideal resin should have high strength and still be flexible. A resin with high toughness would then also provide optimum friction performance.

It is thought that the use of phenolic resin particles as an ingredient in paper formulation and the saturation of the paper formulation with a silicone resin causes a reaction with the saturating silicone resin and produces a new species of resin as a final end product after curing. It has been surprisingly found that the use of a silicone resin as the saturating resin is influential in the friction material performance, Impregnating the porous fibrous base material with the silicone resin provides a friction material with a higher dynamic coefficient of friction than when the impregnating resin is a resole phenolic liquid resin. However, it is not intended that this invention be limited by such theoretical or mechanistic considerations. The point is that the process works, and works well, irrespective as the exact way at which it actually functions.

Silicone resins useful for saturating include, for example, thermal curing silicone sealants and silicone rubbers. One suitable resin is the MTV silicone rubber T40 made by Wacker Silicones Corporation of Adrian, Mich. which is a one-part thermal curing system and comprises xylene and acetylacetone (2,4-pentanedione). The T40 silicone resin has a boiling point of about 362° F. (183° C.); vapor pressure at 68° F. mm, Hg: 21; vapor density (air-1) of 4.8; negligible solubility in water; specific gravity at 25° C. of about 1.09; percent volatile, by weight, 5%; evaporation rate (ether = 1), less than 0.1; flash point about 149° F. (65° C.) using the Pensky-Martens method; and a viscosity, cP at 25° C. of about 900.

Another suitable silicone resin is the T-103 silicone resin, made by Wacker Silicones Corp., which is a one part thermal curing system and has a percent solids of about 50; viscosity, cps at 20° C., of about 60; specific gravity at 25° C. of 0.80; a set or gel time, minutes at 200° C., of about 1 0; a full cure time, minutes at 200° C., of about 60; and, as cured, a hardness, Shore D of about 90.

Another suitable silicone resin is the MTV silicone rubber T-107, made by the Wacker Silicones Corp., which is a one part thermal curing system, having a percent solids of about 100; viscosity, cps at 25° C. of about 80; specific gravity at 25° C. of 1.00; a cure time at 150° C., of about 15 seconds, and a 200° C. of about 10 seconds. Still another suitable resin is the ER-84002 polydimethylsiloxane silicone resin, made by Wacker Silicones Corp., which is a one part solid resin which has high reactivity and heat resistance, and has a melting range of about 50°–100° C.,typically has a particle size of <100 microns, and is soluble in esters, alcohols and aromatic hydrocarbons. It is to be understood, however, that other silicone resins can be utilized with the present invention.

It is further contemplated that other ingredients useful in both preparing resin blends and in various resins used for impregnating fibrous-based materials can be included in the friction material. These ingredients include, for example, graphite particles, elastomeric (polymer) particles and solid cashew shell oil particles. For example, elastomeric polymer particles comprising about 70–75 % elastomeric material with the balance being processing aids such as product 4198 from Palmer International, Worcester, Pa., is useful to provide additional friction lining wear resistance. The rubber-type particles allow the friction material to conform more closely to the mating separator plate in a clutch, for example, and therefore provides an increase in "real" versus "apparent" area of contact between the separator plates.

Various fillers are also used in the friction material of the present invention. In particular, silica fillers, such as diatomaceous earth (celite), are useful. However, it is contemplated that other types of fillers are suitable for use in the present invention and that the choice of filler depends on the particular requirements of the friction material.

It is contemplated that, in certain embodiments, the fibrous base material can be formed from an aqueous slurry comprising about: 3–70%, by wt., aramid floc or fibers; 0–70%, by wt., cotton fibers; 5–70%, by wt., filler material; 3–80%, by wt., phenolic resin material; 3–50%, by wt., silicon nitride powder particles, 0–50%, by wt., graphite and/or carbon particles; 0–40%, by wt., elastomeric polymer particles; 0–40%, by wt., cashew nut shell liquid particles, 0–40% by wt., silica particles; and 0–20% by wt., glass fibers based on the weight of the aqueous slurry formulation for the fibrous base material.

In certain embodiments the fibrous base material preferably comprises about: 5–35%, by wt., aramid floc or fibers; 15–55%, by wt., cotton fibers; 15–35%, by wt., filler material; 3–15%, by wt., phenolic resin material; 3–10%, by wt., silicon nitride particles; 0–35%, by wt., graphite and/or carbon particles; 2–20%, by wt., elastomeric polymer particles; and, 2–25%, by wt., cashew nut shell liquid particles.

In certain embodiments the fibrous base material most preferably comprises about: 3–7%, by wt., aramid floc or fibers; 40–55%, by wt., cotton; 15–30%, by wt., filler; 5–15%, by wt., phenolic resin; 0–5%, by wt., elastomeric particles; 2–7%, by wt., cashew nut shell liquid particles and 4–6%, by wt., silicon nitride particles.

According to the present invention, the presence of a silicone resin, when used to impregnate a fibrous base material, causes the resulting friction material to be flexible or elastic. When pressures are applied to the friction material of the present invention, there is a more even distribution of pressure which, in turn, reduces the likelihood of uneven wear. In preferred embodiments, the fibrous base material is saturated with a silicone resin at a pick up of about 45–55% resin pick up. Various methods for impregnating friction materials can be practiced with the present invention. After the friction material has been impregnated with the silicone resin, the impregnated friction material is heated. The heating cures the phenolic resin at a temperature of about 350° F. and cures the silicone resin at a temperature of about 400° F. In addition, the heating causes the evaporation of any solvents (used to carry the impregnating silicone resin) which may be present. These solvents then can be collected and disposed of in an environmentally sound manner. Thereafter, the impregnated and cured friction material is adhered to a desired substrate (such as a clutch plate or a brake shoe) by suitable means. The final density of the friction material can be further controlled or tailored during bonding.

The following examples provide further evidence that the friction material of the present invention is an improvement over the conventional friction materials. Various preferred embodiments of the invention are described in the following examples, which however, are not intended to limit the scope of the invention.

EXAMPLE 1

A series of Low Velocity Friction Apparatus (LVFA) tests were performed comparing the effectiveness of silicon nitride powder and solid cashew shell oil particles as friction particles, at high and low resin saturation levels. All tests were run using tumbled steel separator plates under 120 psi with Texaco TL8570 ATF as a lubricant.

EXAMPLE 1A

The dynamic coefficient of friction was increased when a level of about 5% silicon nitride powder and about 5% solid cashew shell oil particles are coupled with a level of about 35–40% saturating phenolic resins. While the interaction effect of both the silicon nitride powder and solid cashew shell oil particles substantially contributes to the dynamic friction coefficient, the presence of silicon nitride particles contributes substantially more to the rise in dynamic coefficient of friction magnitude than the solid cashew shell oil particles. Thus, the silicon nitride powder is a contributing variable in both static and dynamic friction coefficient magnitude. It was also found that the saturating phenolic resin content in the friction material is a major variable influencing the increase of static friction. High concentration of silicon nitride powder (about 15%) and saturating phenolic resin (about 48%) can increase the static friction magnitude while interaction of low silicon nitride/solid cashew shell oil particle concentration (about 5%) and low phenolic resin concentration (about 38%) can increase the dynamic friction magnitude.

EXAMPLE 1B

A series of Low Velocity Friction Apparatus tests were performed to evaluate types of solid resins as a friction particles. Table I below shows a silicone resin used for saturating which increased static and dynamic coefficients of friction at all lubricant reservoir temperatures tested. The increase of dynamic friction, obtained when saturating with silicone resin, is further increased when a low concentration of phenolic novolac solid parties is included in the paper formulation. However, when a phenolic resin (such as Arophene 295®) is used as a saturating resin, a high concentration (about 15%) of phenolic novolac solid particle provides no improvement in dynamic frictional performance.

TABLE I

| Percent Contribution - Dynamic Friction | | | |
|---|---|---|---|
| | 300° F. | 200° F. | 100° F. |
| Silicone Resin Solid Particles - ER84002 | 0 | 0 | 0 |
| Phenolic Novolac Solid Particles - EP055200 | 1 | 2 | 6 |
| Type of Saturating Resin | 68 | 82 | 46 |
| Interaction of Phenolic Novolac Solid Particles and Saturating Resin | 16 | 4 | 20 |

EXAMPLE 2

Friction materials saturated with silicone resins provide a high friction coefficient and maximum thermal capacity. In order to further reduce lining wear, yet still maintain high friction coefficient, different types of elastomeric resins were evaluated. In particular, the Wacker Silicone Corp. T-40 and T-103 silicone resin series were compared with several phenolic resins. In these experiments, friction materials with 0%, 5% and 15% phenolic resin powder were made by adding the phenolic powder to the raw paper formulation. These papers were saturated with either silicone T-103 or T-40 resins. The friction materials were subjected to Full Pack tests according to moderate energy procedure 528C. Friction and wear data was tabulated and comparisons were made to commercially available friction materials.

The materials used for data shown in Table II comprised:

| | |
|---|---|
| Friction Material | cotton fibers/Kevlar ® fibers/celite/solid cashew shell oil particles/Si$_3$N$_4$ particles/0% PB200B phenolic resin powder 200 lb. basis weight/0.030 inch caliper |
| Example 1 | T103 resin at 42.8% P.U. (pick up)/F.L.T. (final lining thickness) = 0.025 inch |
| Example 4 | T40 resin at 43.7% P.U./F.L.T. = 0.025 inch |
| Friction Material | cotton fibers/Kevlar ® fibers/celite/solid cashew shell oil particles/Si$_3$N$_4$ particles/5% PB200B phenolic resin powder 200 lb. basis weight/0.030 inch caliper |
| Example 2 | T103 resin at 42.0% P.U./F.L.T. = 0.025 inch |
| Example 5 | T40 resin at 39.0% P.U./F.L.T. = 0.025 inch |
| Friction Material | cotton fibers/Kevlar ® fibers/celite/solid cashew shell oil particles/Si$_3$N$_4$ particles/15% PB200B phenolic resin powder 200 lb. basis weight/0.030 inch caliper |
| Example 3 | T103 resin at 42.0% P.U./F.L.T. = 0.025 inch |
| Example 6 | T40 resin at 39.8% P.U./F.L.T. = 0.025 inch |

The addition of the phenolic powder resin into the raw paper formulation alters the combined resin formulation. The addition of phenolic powder to the friction paper pulp and saturation of the resultant friction paper with a silicone resin provides a friction material with performance advantages that are not exhibited by friction materials comprising either resin separately. In certain embodiments, the amount of phenolic powder required may vary depending on the type of silicone resin used and also the ingredients used in the raw paper making material. For example, a larger amount of phenolic resin powder was desired in order to enhance the wear characteristics of assemblies saturated with the T-40 silicone resin as compared to assemblies saturated with the T-103 silicone resin.

Referring now to Table II below, the addition of a small amount of phenolic resin powder (5%) in the paper formulation resulted in friction and wear resistance advantages. A comparison of Examples 1 and 2 show: the dynamic friction coefficient increased from 0.163 to 0.170, a 4.3 percent increase; the pack loss was reduced from 7 mils to 5 mils; and, the percent friction fade was reduced from 5.2% to 4.5%.

Final static friction readings were about 0.145–0.149 for both the 0% and 5% phenolic resin powder concentration level additions to the friction material. At the higher 15% phenolic resin powder concentration level, the static friction level is 0.137, which level is identical to the all phenolic resin saturated comparative materials.

Figure 1:
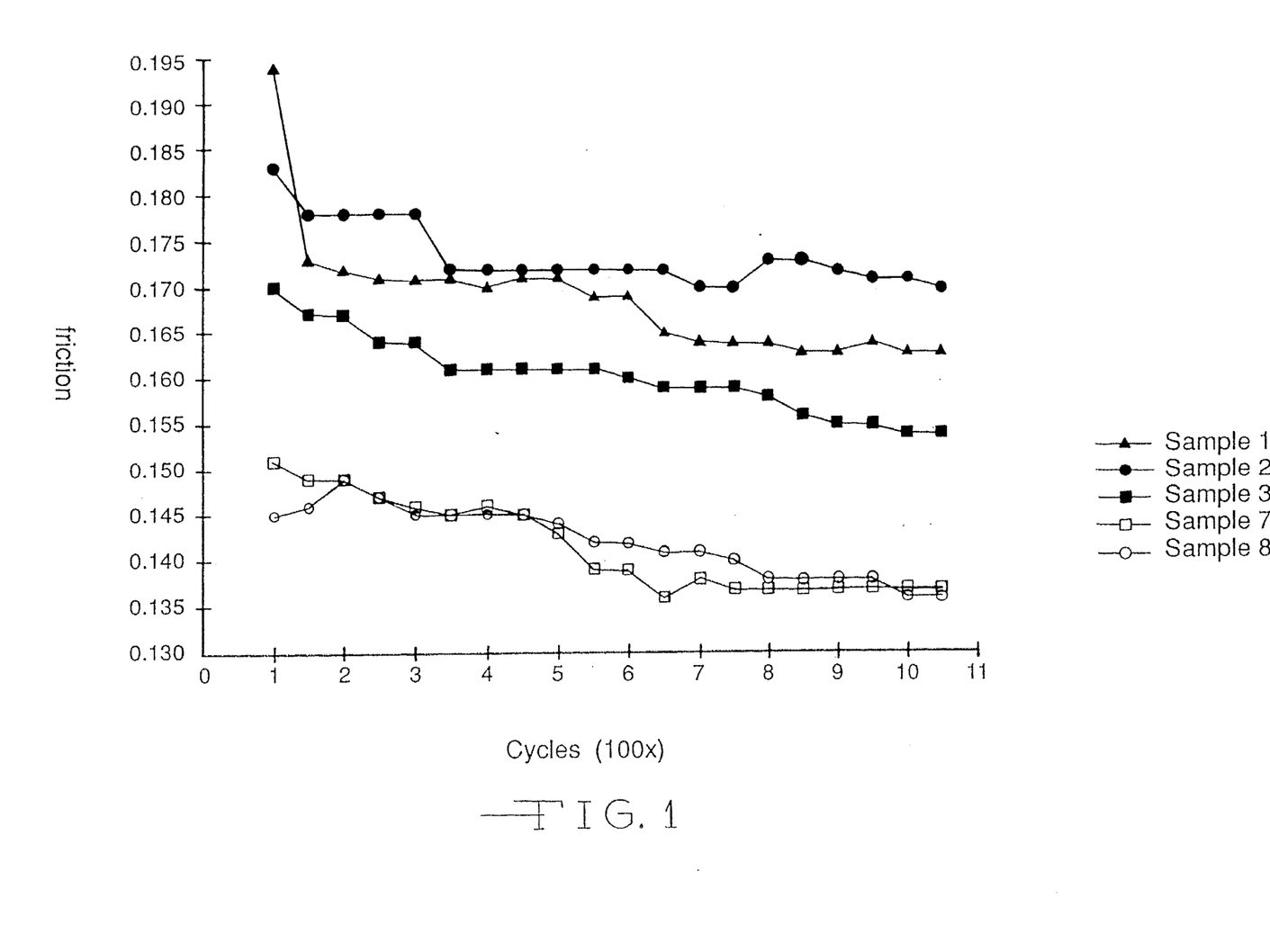
FIG. 1 is a graph comparing the coefficient of friction as the number of cycles increases for various friction lining materials shown in Table II impregnated with the silicone T-103 resin (Examples 1, 2 and 3) and comparative friction materials (Examples 7 and 8).

At the percentages higher than about 15% phenolic resin powder addition to the raw material, the friction materials showed adverse performance traits that began to approach the same performance as from an all phenolic system. FIG. 1 is a graph showing the high speed friction versus cycles for the samples described in Table II comprising in the T103 saturated material and comparative production materials.

Surface appearance rankings of the friction materials improved: the abrasion ranking was reduced from "2" to "0," and the glazing ranking reduced from "3" to "1" on a scale of one to five where the lower numbers reflect a better or preferred ranking. The combined effect of all these performance improvements clearly indicates an advantage of adding a phenolic powder to the raw paper formulation.

When the T40 silicone resin was used as the saturating resin, a higher percent of phenolic powder in the raw paper formulation may be useful in order to achieve optimum performance advantages. At 15% phenolic resin powder concentration, the percent friction fade is reduced to 3.9%, compared to 10.2% and 13.2% at lower concentrations. The more elastic character of the T40 silicone resin as compared to the T103 silicone resin contributes to the fact that about 15% phenolic resin powder in the paper formulation provides a friction material with the optimum results. The final dynamic friction coefficient is 0.170 for the samples with 15% phenolic resin concentration. Friction and wear values are improved when phenolic resin powder is added to the raw paper formulation.

The lining surface condition rankings are excellent at the 15% phenolic resin powder concentration level. Glazing is a low "1" ranking. Abrasion, breakout, and delamination are all ranked "0." These are the same rankings as the samples saturated with the T103 silicone resin at the 5% phenolic resin powder concentration level.

Figure 2:
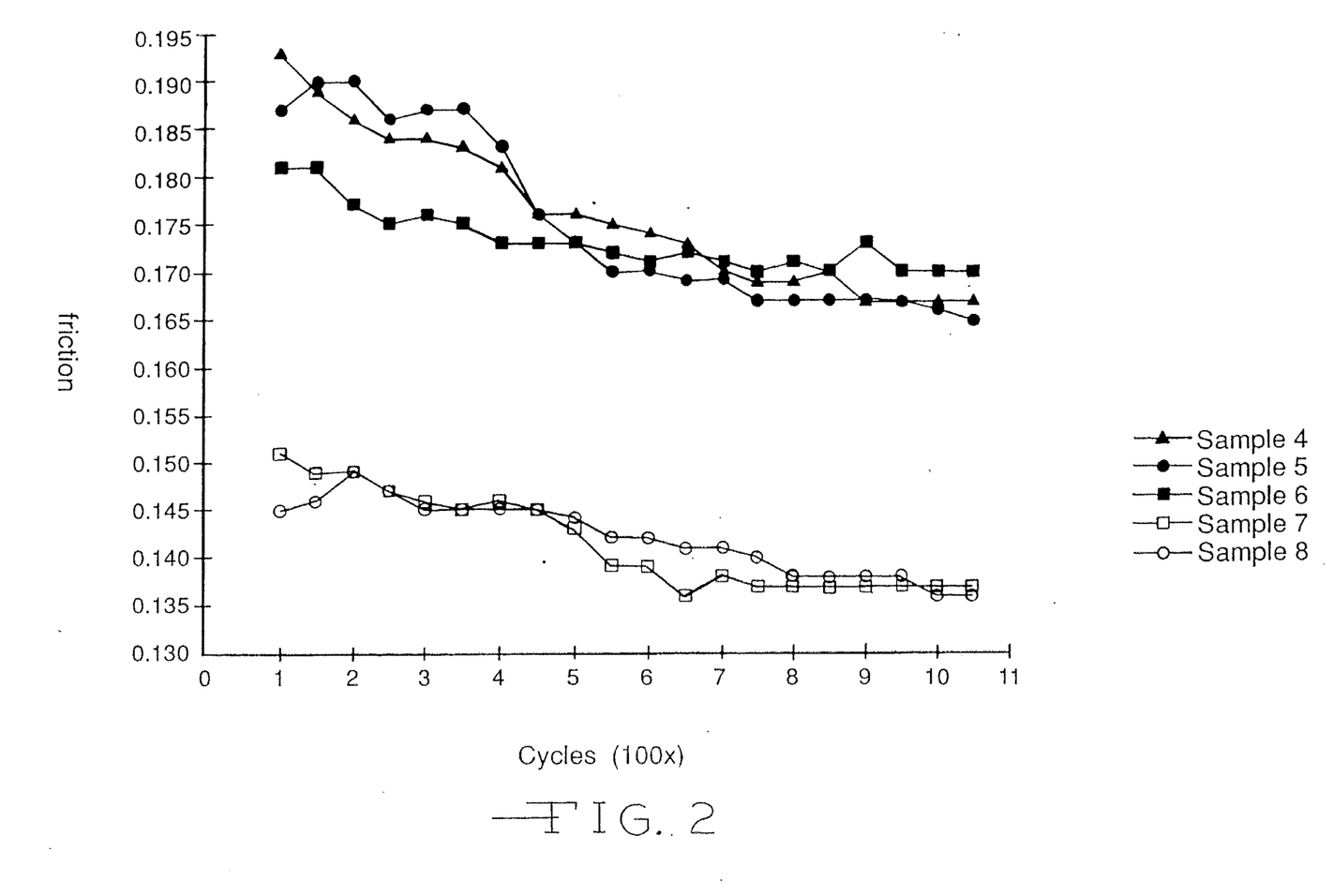
FIG. 2 is a graph comparing the coefficient of friction as the number of cycles increases for various friction lining materials shown in Table II impregnated with the silicone T-40 resin (Examples 4, 5 and 6) and comparative friction materials (Examples 7 and 8).

The static friction coefficient for both the T40 and T103 silicone saturated materials are similar at about 0.149. In all tests, the comparative examples 7 and 8 had lower static friction coefficients compared to the silicone resin saturated friction materials. FIG. 2 is a graph showing the high speed friction versus cycles for the T40 saturated material and the comparative production materials. Average friction coefficients are plotted against the number of cycles for all tests.

Material containing phenolic resin and saturated with silicone T103 and T40 resins performed with higher static (about 8 to about 9%) and dynamic (about 20 to about 24%) friction coefficients compared to the comparative production materials.

The pack loss data shows that the friction materials saturated with T103 resin exhibited about half the amount of wear as the comparative production material.

The addition of phenolic powder into the fibrous base material formulation and saturation with silicone resin provides an increase of dynamic friction coefficient, improved resistance to high speed dynamic friction fade, improved resistance to surface damage, and improved assembly wear resistance.

TABLE II

Full Pack Test Laboratory Friction Data
Procedure 528C/Exxon 1975 Type "H" ATF - 200° F.
Phenolic Resin Powder P8200B/1050 Cycle Data

| Material Identification | Low Speed Dynamic (a) | High Speed Dynamic | Pack Loss Mils | Percent Fade (b) | Assembly Rank (c) |
|---|---|---|---|---|---|
| Sample 1: 0% Phenolic T103 Silicone Resin | 0.145 | 0.163 | 7 | 5.2 | 2,0,3,0 |

TABLE II-continued

Full Pack Test Laboratory Friction Data
Procedure 528C/Exxon 1975 Type "H" ATF - 200° F.
Phenolic Resin Powder P8200B/1050 Cycle Data

| Material Identification | Low Speed Dynamic (a) | High Speed Dynamic | Pack Loss Mils | Percent Fade (b) | Assembly Rank (c) |
|---|---|---|---|---|---|
| Sample 2: 5% Phenolic T103 Silicone Resin | 0.149 | 0.170 | 5 | 4.5 | 0,0,1,0 |
| Sample 3: 15% Phenolic T103 Silicone Resin | 0.137 | 0.154 | 10 | 7.8 | 1,0,2,0 |
| Sample 4: 0% Phenolic T40 Silicone Resin | 0.149 | 0.167 | 14 | 10.2 | 1,0,2,0 |
| Sample 5: 5% Phenolic T40 Silicone Resin | 0.149 | 0.165 | 17 | 13.2 | 1,0,1,0 |
| Sample 6: 15% Phenolic T40 Silicone Resin | 0.149 | 0.170 | 13 | 3.9 | 0,0,1,0 |
| Comparative Sample 7 | 0.129 | 0.137 | 20 | 8.1 | 2,1,2,0 |
| Comparative Sample 8 | 0.138 | 0.136 | 14 | 8.7 | 1,1,2,0 |

(a) Low speed dynamic friction coefficient.
(b) Percent high speed dynamic friction fade between cycles 200 and 1050.
(c) Assembly rank values given are abrasion, breakout, glazing, and delamination, respectively.

EXAMPLE 3

Referring now to Table III below, a comparison was made between phenolic resin alone, and with silicon nitride particles as ingredients in an aqueous paper formulation. The final resulting resin mixture comprised about 5% PB206 phenolic resin powder. Five different raw paper formulations were made: XP116, XP121, 9416, RHS30, and HS95.

The formulations comprised:

XP116: cotton fibers/Kevlar® fibers/celite/graphite particles/carbon particles/PB206 phenolic resin XP121: cotton fibers/Kevlar® fibers/celite/graphite particles/PB206 phenolic resin 9416: cotton fibers/Kevlar® fibers/celite/solid cashew shell oil particles/elastomeric (polymer) particles/$Si_3N_4$ particles/PB206 phenolic resin RHS-30: Kevlar® fibers/celite/silica particles/elastomeric (polymer) particles/glass fibers/PB206 phenolic resin HS95: cotton fibers/Kevlar® fibers/celite/solid cashew shell oil particles/$Si_3N_4$ particles/PB206 phenolic resin The data in Tables III and IV below support the synergistic effect between powdered phenolic resin in the fibrous base material and the silicone resin. This data effectively illustrates the performance of having the two resins present in an end product. The same type of favorable synergistic effect was not shown when a phenolic powder and a phenolic saturating resin were used.

EXAMPLE 3A

The hand sheet formulations above were saturated with liquid silicone resin to achieve about a 50–55% silicone resin pick up, and then cured for 120 minutes at 400° F. to form friction materials. All the friction materials were made at 200 lb. basis weight and were bonded, wire side up, to form an assembly part. The friction materials were submitted for clutch pack tests according to procedures 528 and 527. All tests were performed with Exxon 1975 Type "H" lubrication. The results are shown in Table III below.

Figure 3:
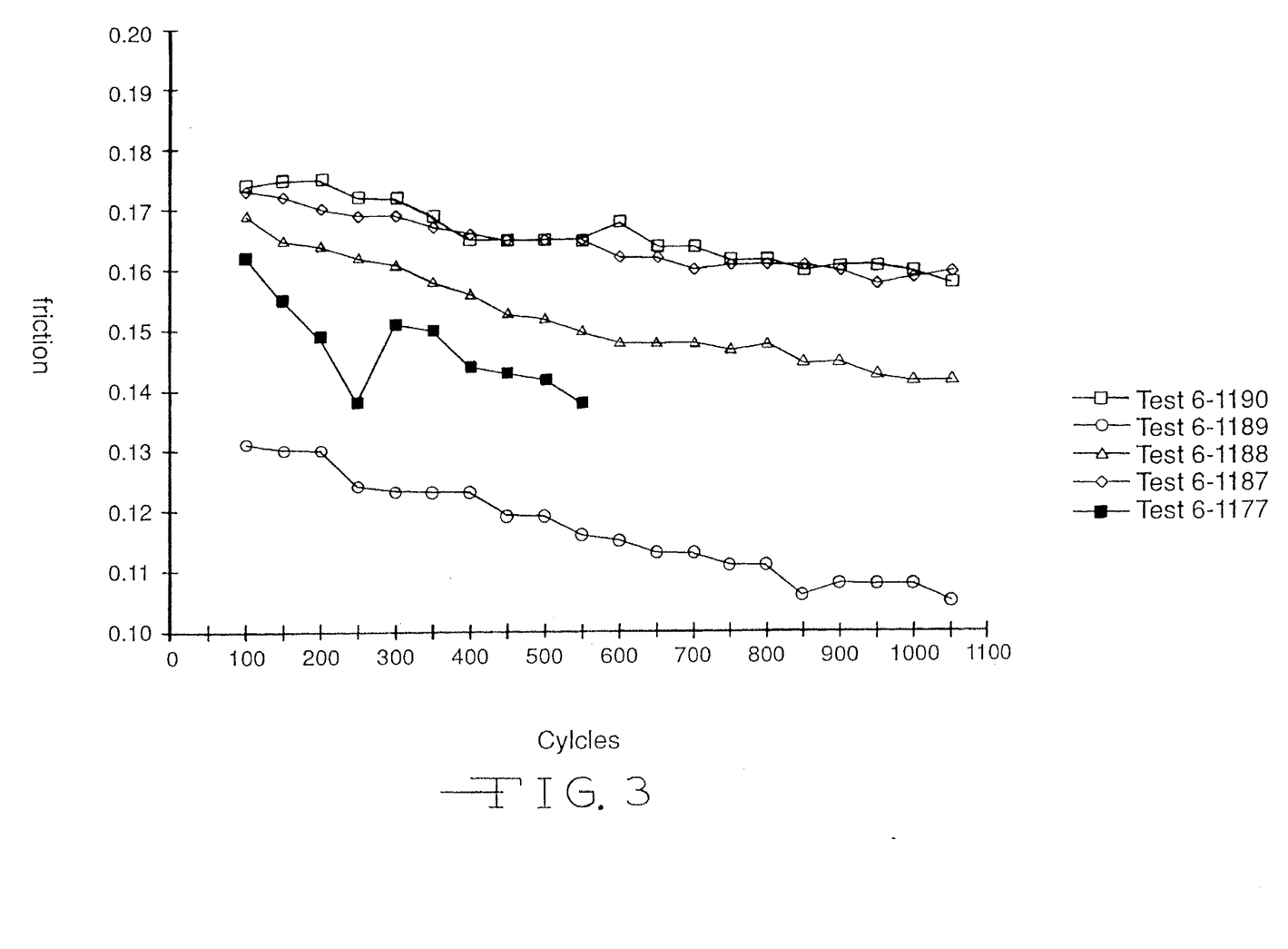
FIG. 3 is a graph comparing the coefficient of friction as the number of cycles increases for various friction lining materials shown in Table III for paper formulations (containing 5% PB206 phenolic resin in the raw paper slurry) and thereafter impregnated with a silicone T103 resin.

Most of the friction materials resulted in a pack gain after testing. All the materials tested had surface appearance rankings of "0" or "1." The materials saturated with the T103 silicone resin had S/D ratios ranging from 0.95 to 1.25. The average friction versus cycle graphs for the individual materials listed in Table II are shown in FIG. 3.

Friction materials comprised of the HS121 (6-1187) and 9416 (6-1190) type materials both produced a dynamic friction coefficient of 0.160 after an about 6% and 10% fade, respectively.

The XP116 type material saturated with silicone T103B (6-1189) produced the lowest dynamic friction coefficient of 0.105 after a 19% fade. This material tested with an ascending curve (1.25 S/D ratio).

RHS30 type material (6-1188) resulted in 0.142 dynamic friction coefficient after a 13% fade. HS95 type material (6-1177) failed the test after 550 cycles.

TABLE III

Full Pack Laboratory Data - 1050 Cycle
Exxon 1975 Type "H" ATF - Procedure 528
Silicone T103 Saturated Resin System - 5% P8206 in raw paper slurry
Wire Side Up - Final Lining Thickness = 0.020"

| Material Formulation | Fric. ui (a) | Fric. ud (b) | Fric. us (c) | Pack Loss (mils) | Percent Fade (d) | Assembly Rank (e) |
|---|---|---|---|---|---|---|
| XP116 Test 6-1189 | 0.105 | 0.121 | 0.131 | 0.0 | 19.2 | 0,0,1,0 |
| XP121 Test 6-1187 | 0.160 | 0.157 | 0.152 | −9.6 (gain) | 5.9 | 0,0,1,0 |
| RHS30 | 0.142 | 0.139 | 0.138 | −4.3 | 13.4 | 0,0,1,0 |

TABLE III-continued

Full Pack Laboratory Data - 1050 Cycle
Exxon 1975 Type "H" ATF - Procedure 528
Silicone T103 Saturated Resin System - 5% P8206 in raw paper slurry
Wire Side Up - Final Lining Thickness = 0.020"

| Material Formulation | Fric. ui (a) | Fric. ud (b) | Fric. us (c) | Pack Loss (mils) | Percent Fade (d) | Assembly Rank (e) |
|---|---|---|---|---|---|---|
| Test 6-1188 | | | | (gain) | | |
| HS95 | 0.138 | 0.140 | 0.137 | 5.0 | NA | NA |
| Test 6-1177 | (@ 550)* | (@ 500)* | (@ 550)* | (@ 550)* | | |
| 9416 | 0.158 | 0.158 | 0.162 | −1.6 | 9.7 | 0,1,1,0 |
| Test 6-1190 | | | | (gain) | | |

(a) Fric. ui is the dynamic friction coefficient at high speed.
(b) Fric. ud is the midpoint friction coefficient.
(c) Fric. us is the slow speed friction coefficient.
(d) Percent friction fade (using ui) is calculated between cycles 200 through 1050.
(e) Assembly rank values given are abrasion, breakout, glazing, and delamination, respectively.
*Indicates the test stopped, or failed, at the cycle number given.

EXAMPLE 3B

Figure 4:
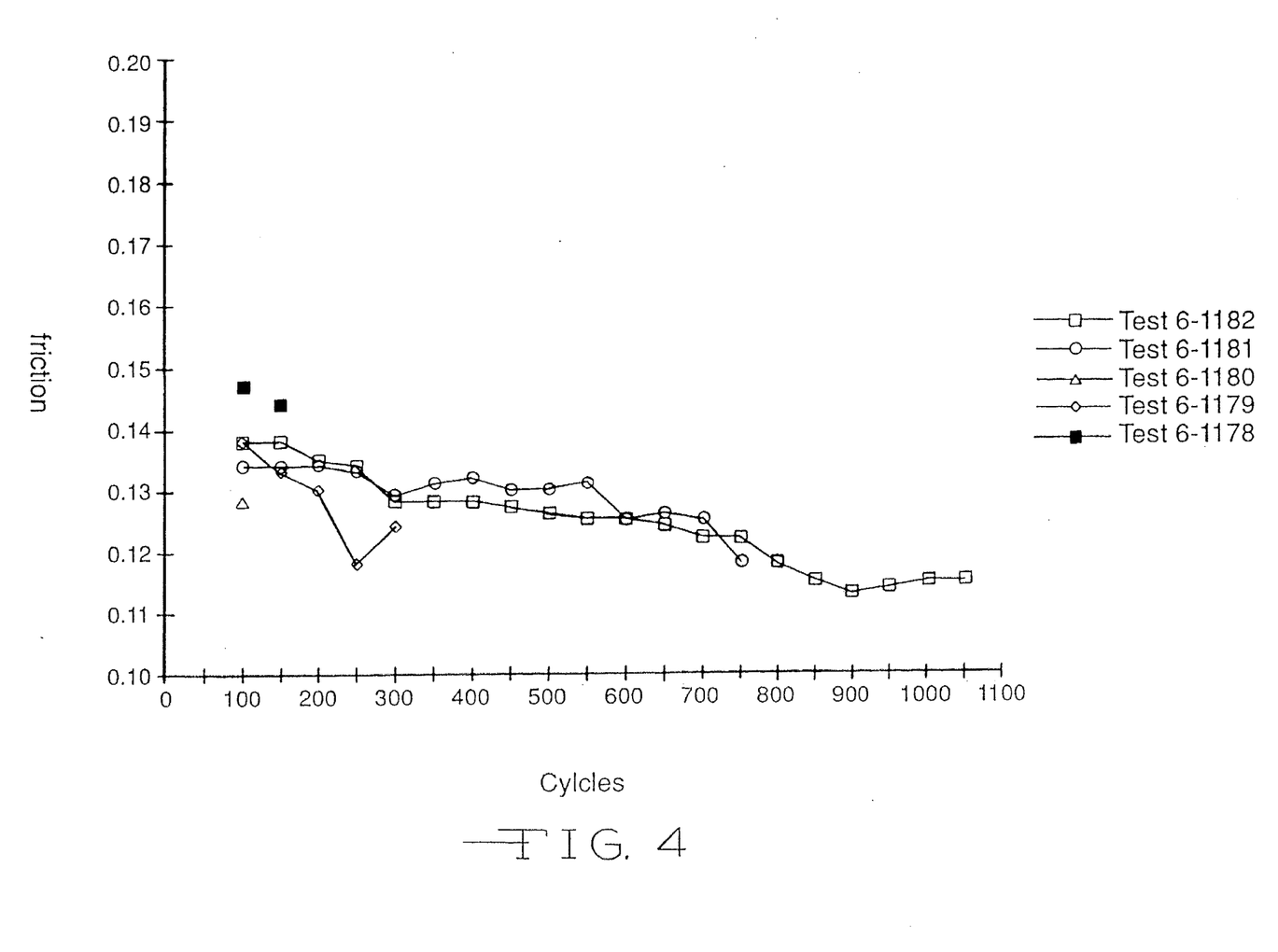
FIG. 4 is a graph comparing the coefficient of friction as the number of cycles increases for various friction lining materials shown in Table IV for paper formulations (containing a 5% PB206 phenolic resin in the raw paper slurry) and thereafter impregnated with a phenolic Arophene® 295 resin.

Referring to Table IV below, samples of the above paper formulations were saturated with phenolic Arophene® 295 resin. Except for the 9416 paper formulation, all the friction materials saturated with Arophene® 295 phenolic resin failed the test. The 9416 type material (test 6-1182) had a 0.115 dynamic friction coefficient after 15% fade. This test resulted in an unfavorable ascending (S/D ratio) curve, but the surface appearance rankings were favorable. Only the glaze ranking of "3" was high. Table IV below lists a summary of friction and wear data. FIG. 4 illustrates the combined friction versus cycles for the phenolic Arophene® 295 saturated materials.

EXAMPLE 30

After the ingredients are mixed to form the fibrous base material, the ingredients are placed on a screen and water is removed using gravity and vacuum. The wire side of the fibrous base material tends to reflect a topography similar to that of the screen used. Also, depending upon the individual ingredients, densities and rate of water extraction, the smaller and lighter weight particles may tend to accumulate towards the screen side slightly more than towards the felt side of the fibrous base material. The felt side of the fibrous base material may tend to have a topography which is closer to that produced from the flowing water slurry. Typically, the wire side of the friction material will have a slight symmetrically-type pattern apparent while the felt side reflects a more random water flow or possibly swirled-type pattern.

The material surface profiles of the above formulations were compared for both "wire" and "felt" sides of the assembly. A summary of the surface texture results is given in Table V below. It is seen in Table III above that the XP116 and XP121 materials saturated with a silicone resin successfully completed the Full Pack test; yet these same materials failed when saturated with a phenolic resin within 750 and 300 cycles, respectively. This wire side failure of phenolic materials shows the relationship between surface topography and clutch performance. The 9416 material was roughest in terms of its arithmetic average (Ra). The ingredients used in the formulation influence the resulting topography of the friction material. The wire side of friction material tends to be rougher than the felt side.

TABLE IV

Full Pack Laboratory Data - 1050 Cycle
Exxon 1975 Type "H" ATF - Procedure 528
Phenolic 295 Saturated Resin System - 5% PB206 in raw paper slurry
Wire Side Up - Final Lining Thickness = 0.020"

| Material Formula | Fric. ui (a) | Fric. ud (b) | Fric. us (c) | Pack Loss (mils) | Percent Fade (d) | Assembly Rank (e)* |
|---|---|---|---|---|---|---|
| XP116 | 0.118 | 0.130 | 0.129 | NA | NA | NA |
| Test 6-1181 | (@ 750)* | (@ 750)* | (@ 750)* | | | |
| XP121 | 0.124 | 0.136 | 0.135 | NA | NA | NA |
| Test 6-1179 | (@ 300)* | (@ 300)* | (@ 250)* | | | |
| RHS30 | 0.128 | 0.160 | NA | | NA | NA |
| Test 6-1180 | (@ 100)* | (@ 100)* | | | | |
| HS95 | 0.144 | 0.164 | 0.158 | NA | NA | NA |
| Test 6-1178 | (@ 150)* | (@ 150)* | (@ 150)* | | | |
| 9416 | 0.115 | 0.128 | 0.139 | 3.8 | 14.8 | 0,1,3,0 |
| Test 6-1182 | | | | | | |

(a) Fric. ui is the dynamic friction coefficient at high speed.
(b) Fric. ud is the midpoint friction coefficient.
(c) Fric. us is the slow speed friction coefficient.
(d) Percent friction fade (using ui) is calculated between cycles 200 through 1050.
(e) Assembly rank values given are abrasion, breakout, glazing, and delamination, respectively.
*Indicates the test stopped or failed at the cycle number given.

TABLE V

Surface Texture Parameters - Talysurf 10
Mean data - Five profiles per assembly side

| | Sm | Ra | Rp | Rv | Rt | HTP* |
|---|---|---|---|---|---|---|
| XP116 wire | 4.3 ± 1.0 | 208.4 ± 25.8 | 667.3 ± 63.3 | 892.1 ± 65.1 | 1559.4 ± 113.2 | 237.2 ± 36.06 |
| XP116 felt | 4.7 ± 0.6 | 191.9 ± 20.3 | 633.2 ± 74.9 | 972.1 ± 118.9 | 1605.3 ± 187.7 | 226.2 ± 29.05 |
| XP121 wire | 3.9 ± 0.4 | 207.3 ± 23.7 | 708.5 ± 137.6 | 1056.6 ± 223.1 | 1765.1 ± 300.1 | 246.9 ± 52.77 |
| XP121 felt | 5.0 ± 1.0 | 206.8 ± 24.0 | 777.5 ± 141.6 | 871.8 ± 148.7 | 1649.3 ± 225.9 | 252.4 ± 21.57 |
| RHS30 wire | 3.8 ± 0.6 | 139.6 ± 17.7 | 459.8 ± 153.2 | 613.9 ± 102.7 | 1073.7 ± 252.6 | 173.2 ± 36.41 |
| RHS30 felt | 3.7 ± 0.5 | 159.9 ± 38.4 | 580.7 ± 204.9 | 662.6 ± 160.4 | 1243.3 ± 325.7 | 231.2 ± 83.64 |
| HS95 wire | 4.1 ± 0.8 | 204.5 ± 27.2 | 838.8 ± 291.1 | 980.7 ± 226.4 | 1819.5 ± 449.4 | 268.1 ± 98.15 |
| HS95 felt | 4.1 ± 0.7 | 177.8 ± 15.3 | 564.3 ± 42.0 | 790.2 ± 146.1 | 1354.4 ± 167.0 | 198.6 ± 20.02 |
| 9416 wire | 6.3 ± 1.2 | 277.8 ± 24.1 | 917.8 ± 217.8 | 1225.4 ± 175.9 | 2143.2 ± 337.4 | 400.1 ± 88.38 |
| 9416 felt | 4.9 ± 0.3 | 251.0 ± 26.6 | 938.4 ± 234.7 | 1064.9 ± 408.6 | 2003.3 ± 611.2 | 352.3 ± 76.57 |

*HTP from 5%–30%
Ra = arithmetic mean of the departures of the roughness profile from the mean line.
Rp = the maximum height of the profile above the mean line within the assessment length.
Rv = the maximum depth of the profile below the mean line within the assessment length.
Rt = Rp + Rv
Sm = the mean spacing between profile peaks at the mean line, measured over the assessment length.
HTP = material bearing ratio

EXAMPLE 4

Friction materials were made from the 9416 paper formulation containing PB206 phenolic resin powder at 0%, 5%, and 15% concentration levels, and then saturated with silicone resins.

EXAMPLE 4A

When the friction materials containing 5% powder were saturated with a silicone resin, the pack wear was lowest, and friction the highest. The friction initial and midpoint friction slightly increased from 0.152 to 0.158, as shown in Table VI below in tests 6-1186 and 6-1190. Wear resistance for the 5% phenolic resin was improved from minus 3.0 mils (test 6-1186) to zero (test 6-1190). However, when the higher 15% concentration of phenolic resin powder (test 6-1191) was used, the material failed the test within 750' cycles.

Saturating the fibrous base material with a different type of silicone resin (for example, as shown in T40 silicone (Test 6-1154) versus T103 silicone (Test 6-1186)) produces friction materials that have different friction and wear results (as shown in Table VI below). The friction materials saturated with the T40 silicone resin had higher friction coefficient, and higher wear resistance. However, the surface appearance of these T40 silicone saturated friction materials exhibited substantially more abrasion compared to the same material saturated with the T103 silicone saturated friction materials.

Figure 5:
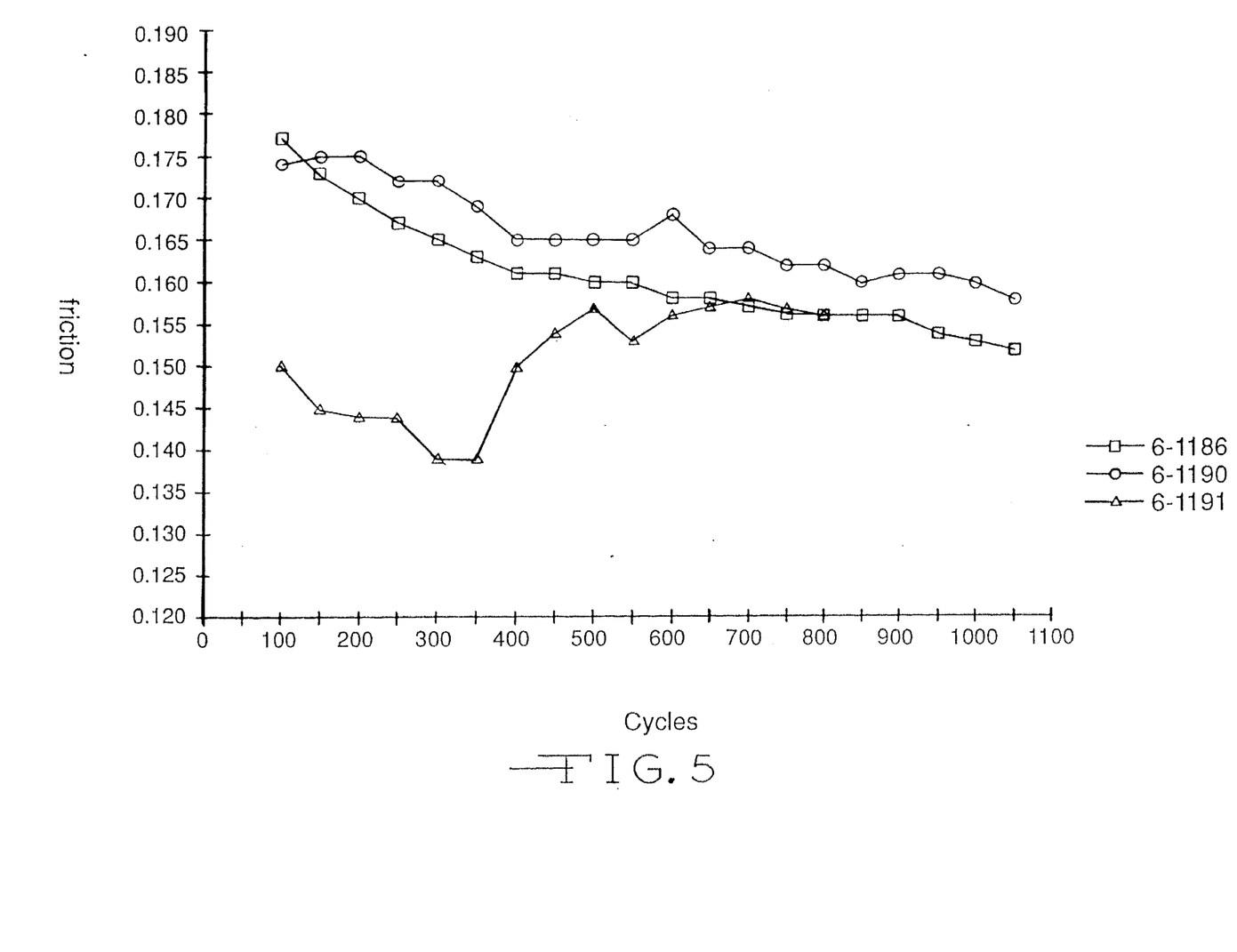
FIG. 5 is a graph comparing the coefficient of friction as the number of cycles increases for various friction lining materials shown in Table VI for paper formulations (containing a phenolic PB206 resin powder at 0%, 5% and 15% concentrations in the raw paper slurry) and thereafter impregnated with silicone T103B resin.

FIG. 5 illustrates the friction performance improvement obtained from the addition of phenolic resin powder to the paper formulation for the fibrous base materials saturated with T103 silicone resin (Tests 6-1186, 6-1190 and 6-1191) described in Table VI.

TABLE VI

Full Pack Laboratory Data
Exxon 1975 Type "H" ATF - Procedure 528
Silicone T103 Saturated Resin System - 9416 Type Material
Wire Side Up - Final Lining Thickness = 0.020"
Phenolic PB206 Powder @ 0% 5% and 15% Concentration in Raw Paper Slurry

| Material Formulation | Fric. ui (a) | Fric. ud (b) | Fric. us (c) | Pack Loss (mils) | Percent Fade (d) | Assembly Rank (e) |
|---|---|---|---|---|---|---|
| 0% PB206 | 0.152 | 0.152 | 0.148 | 3.0 | 10.6 | 0,2,2,0 |
| 5% PB206 Test 6-1190 | 0.158 | 0.158 | 0.162 | −1.6 (gain) | 9.7 | 0,1,1,0 |
| 15% PB206 Test 6-1191 | 0.156 (@ 800)* | 0.163 (@ 800)* | 0.145 (@ 750)* | NA | NA | NA |
| 0% PB206 Test 6-1154 T40 Resin | 0.166 | 0.166 | 0.166 | −3.0 (gain) | 7.3 | 3,2,2,0 |

(a) Fric. ui is the dynamic friction coefficient at high speed.
(b) Fric. ud is the midpoint friction coefficient.
(c) Fric. us is the slow speed friction coefficient.
(d) Percent friction fade (using ui) is calculated between cycles 200 through 1050.
(e) Assembly rank values given are abrasion, breakout, glazing, and delamination, respectively.
*Indicates the test stopped, or failed, at the cycle number given.

EXAMPLE 4B

In order to determine whether there was any performance advantage from the addition of the phenolic resin powder to a material saturated with phenolic resin, three additional tests were performed. Friction materials of the 9416 formulation were made with 0%, 5%, and 15% concentrations of phenolic resin powder and then saturated with a phenolic Arophene® 295 resin. As seen in Table VII below, there is no advantage to adding a phenolic resin powder addition to a fibrous base material that will be saturated with a phenolic resin. The higher amount of phenolic resin to the fibrous base material resulted in slightly lower dynamic friction coefficient, and less wear resistance. The friction dropped from 0.113 to 0.097 with the addition of 15% phenolic resin powder. Pack loss also increased from roughly zero to nearly 9 mils with the powder addition.

Figure 6:
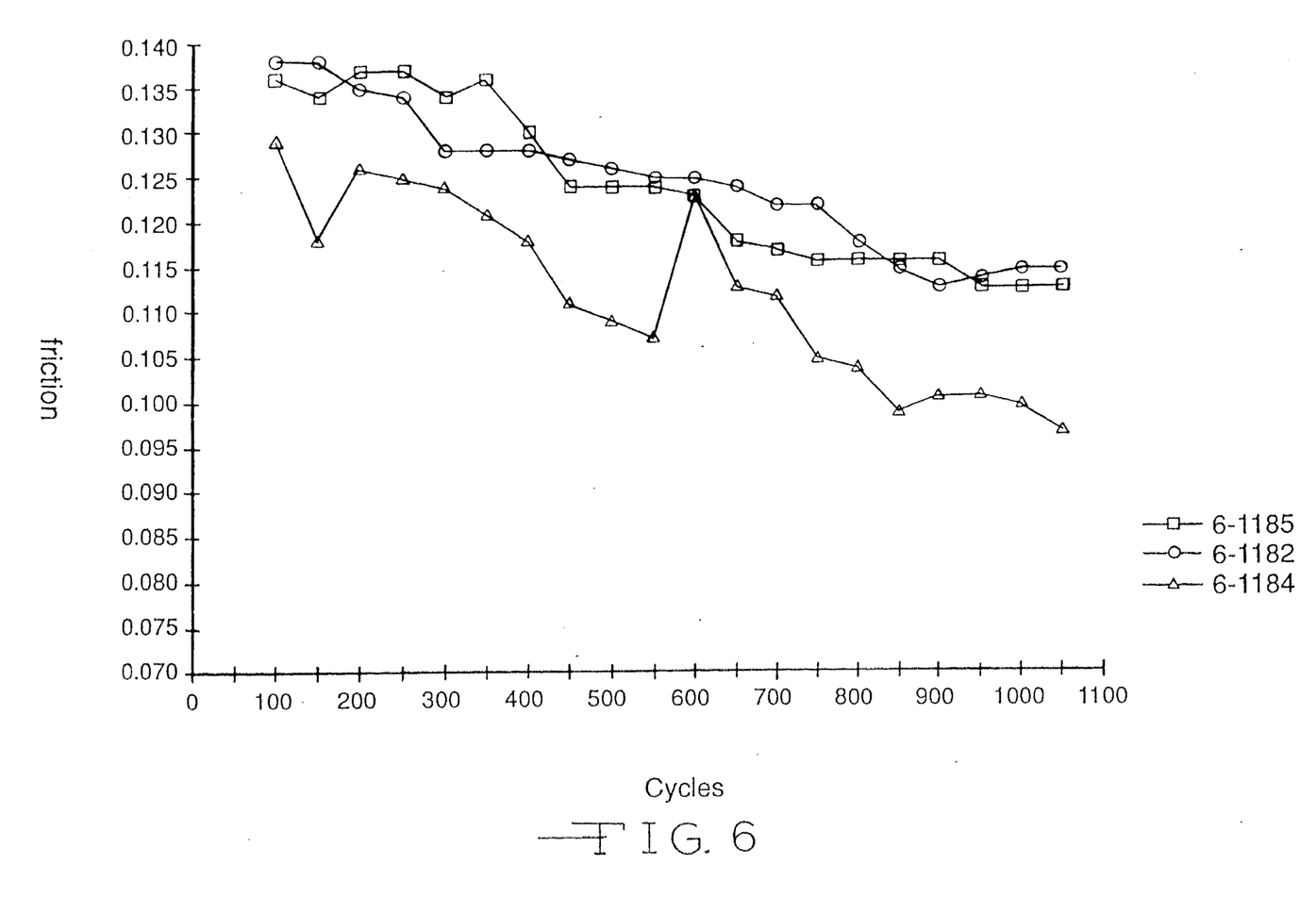
FIG. 6 is a graph comparing the coefficient of friction as the number of cycles increases for various friction lining materials shown in Table VII for various paper formulations (containing a phenolic PB206 powder resin at 0%, 5% and 15% concentrations in the raw paper slurry) and impregnated with a phenolic Arophene® 295 resin.

FIG. 6 illustrates the friction performance for friction materials containing different amounts of phenolic resin powder in the fibrous base formulation and saturated with a phenolic resin.

TABLE VII

Full Pack Laboratory Data
Exxon 1975 Type "H" ATF - Procedure 528
Phenolic Arophene ® 295 Saturated
Resin System - 9416 Type Material
Wire Side Up - Final Lining Thickness = 0.020"
Phenolic PB206 Powder @ 0% 5% and
15% Concentration in Raw Paper Slurry

| Material Formulation | Fric. ui (a) | Fric. ud (b) | Fric. us (c) | Pack Loss (mils) | Percent Fade (d) | Assembly Rank (e) |
|---|---|---|---|---|---|---|
| 0% Phenolic Test 6-1185 | 0.113 | 0.132 | 0.146 | −1.1 (gain) | 17.5 | 0,1,4,0 |
| 5% Phenolic Test 6-1182 | 0.115 | 0.128 | 0.139 | 3.8 | 14.8 | 0,1,3,0 |
| 15% Phenolic Test 6-1184 | 0.097 | 0.117 | 0.141 | 8.6 | 23.0 | 0,1,4,0 |

(a) Fric. ui is the dynamic friction coefficient at high speed.
(b) Fric. ud is the midpoint friction coefficient.
(c) Fric. us is the slow speed friction coefficient.
(d) Percent friction fade (using ui) is calculated between cycles 200 through 1050.
(e) Assembly rank values given are abrasion, breakout, glazing, and delamination, respectively.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

I claim:

1. A non-asbestos friction material for use in a substantially wet environment comprising a porous fibrous base material made from an aqueous slurry comprising fibrous material, at least one solid powdered phenolic or phenolic-modified resin, and at least one inert filler in amounts sufficient to enable the aqueous slurry to be formed into a porous fibrous base material; wherein the fibrous base material is impregnated with a silicone resin to form the friction material such that the friction material exhibits high heat resistance and a relatively uniform coefficient of friction.

2. The friction material of claim 1, wherein the phenolic or phenolic-modified resin is present in the fibrous base material as a powder in an amount of about 3 to about 80%, by weight, based on the weight of the fibrous base material.

3. The friction material of claim 1, wherein the fibrous base material further comprises silicon nitride particles in an amount sufficient to provide the friction material with frictional stability.

4. The friction material of claim 1, wherein the fibrous base material further comprises elastomeric friction particles in an amount sufficient to provide the friction material with lining wear resistance.

5. The friction material of claim 3, wherein the fibrous base material is formed from an aqueous slurry formulation which comprises from about 3% to about 70%, by weight, aramid fibers; from about 0% to about 70%, by weight, cotton fibers; from about 5% to about 70%, by weight, filler material; from about 3% to about 80%, by weight, phenolic or phenolic-modified resin; from about 3% to about 50%, by weight, silicon nitride powder, from about 0% to about 40%, by weight, elastomeric friction particles; and, from about 0% to about 40%, by weight, cashew shell nut liquid particles, based on the weight of the aqueous slurry formulation for the fibrous base material.

6. A friction element according to claim 1 in the form of a clutch facing.

7. A friction element according to claim 5 in the form of a clutch facing.

8. A friction element according to claim 1 in the form of a brake shoe lining.

9. A friction element according to claim 5 in the form of a brake shoe lining.

10. The product produced by adding at least one solid powdered phenolic or phenolic-modified resin to an aqueous slurry comprising fibrous material and at least one filler material, forming a porous fibrous base material from the aqueous slurry, impregnating the porous fibrous base material with a silicone resin, and thereafter heating the impregnated fibrous base material to cure the phenolic or phenolic-modified resin and the silicone resin.

11. The product of claim 10, wherein the phenolic resin is a phenolic novolac resin and the amount of phenolic novolac resin present ranges from about 3% to about 80%, by weight, based on the weight of the fibrous base material.

12. The product of claim 11, wherein silicon nitride particles are added to the aqueous slurry, the amount of silicon nitride particles present ranging from about 3% to about 50%, by weight, of the fibrous base material.

13. A non-asbestos friction material for use in a substantially wet environment comprising a porous fibrous base material made from an aqueous slurry comprising fibrous material, at least one phenolic or phenolic-modified resin, silicon nitride particles in an amount sufficient to provide the friction material with frictional stability, and at least one inert filler in amounts sufficient to enable the aqueous slurry to be formed into a porous fibrous base material; wherein the fibrous base material is impregnated with a silicone resin to form the friction material such that the friction material exhibits high heat resistance and a relatively uniform coefficient of friction.

14. The friction material of claim 13, wherein the phenolic or phenolic-modified resin is present in the fibrous base material as a powder in an amount of about 3 to about 80%, by weight, based on the weight of the fibrous base material.

15. The friction material of claim 13, wherein the fibrous base material further comprises elastomeric friction particles in an amount sufficient to provide the friction material with lining wear resistance.

16. The friction material of claim 13, wherein the fibrous base material is formed from an aqueous slurry formulation which comprises from about 3% to about 70%, by weight, aramid fibers; from about 0% to about 70%, by weight, cotton fibers; from about 5% to about 70%, by weight, filler material; from about 3% to about 80%, by weight, phenolic or phenolic-modified resin; from about 3% to about 50%, by weight, silicon nitride powder; from about 0% to about 40%, by weight, elastomeric friction particles; and, from about 0% to about 40%, by weight, cashew shell nut liquid particles, based on the weight of the aqueous slurry formulation for the fibrous base material.

17. A friction element according to claim 13 in the form of a clutch facing.

18. A friction element according to claim 16 in the form of a clutch facing.

19. A friction element according to claim 13 in the form of a brake shoe lining.

20. A friction element according to claim 16 in the form of a brake shoe lining.

* * * * *